(12) United States Patent
Kim et al.

(10) Patent No.: US 10,356,394 B2
(45) Date of Patent: Jul. 16, 2019

(54) APPARATUS AND METHOD FOR MEASURING POSITION OF STEREO CAMERA

(71) Applicant: ELECTRONICS AND TELECOMMUNICATIONS RESEARCH INSTITUTE, Daejeon (KR)

(72) Inventors: Jae-Hean Kim, Sejong (KR); Hyun Kang, Daejeon (KR); Soon-Chul Jung, Daejeon (KR); Young-Mi Cha, Daejeon (KR); Jin-Sung Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 571 days.

(21) Appl. No.: 15/046,929

(22) Filed: Feb. 18, 2016

(65) Prior Publication Data

US 2016/0379354 A1 Dec. 29, 2016

(30) Foreign Application Priority Data

Jun. 26, 2015 (KR) .......................... 10-2015-0091444

(51) Int. Cl.
*H04N 13/239* (2018.01)
*H04N 13/00* (2018.01)

(52) U.S. Cl.
CPC ... *H04N 13/239* (2018.05); *H04N 2013/0074* (2013.01); *H04N 2013/0081* (2013.01)

(58) Field of Classification Search
CPC ......... H04N 13/239; H04N 2013/0074; H04N 2013/0081
USPC ......................................................... 382/106
See application file for complete search history.

(56) References Cited

U.S. PATENT DOCUMENTS

| 7,747,151 | B2 * | 6/2010 | Kochi | G01B 11/24 348/50 |
| 8,860,795 | B2 * | 10/2014 | Suzuki | G06K 9/00221 348/77 |
| 2004/0119716 | A1 | 6/2004 | Park et al. | |
| 2007/0288141 | A1 | 12/2007 | Bergen et al. | |
| 2008/0144925 | A1 | 6/2008 | Zhu et al. | |
| 2008/0201101 | A1 | 8/2008 | Hebert et al. | |

(Continued)

FOREIGN PATENT DOCUMENTS

KR    10-2009-0088516 A    8/2009

*Primary Examiner* — Amandeep Saini
(74) *Attorney, Agent, or Firm* — LRK Patent Law Firm

(57) ABSTRACT

An apparatus and method for measuring the position of a stereo camera. The apparatus for measuring a position of the camera according to an embodiment includes a feature point extraction unit for extracting feature points from images captured by a first camera and a second camera and generating a first feature point list based on the feature points, a feature point recognition unit for extracting feature points from images captured by the cameras after the cameras have moved, generating a second feature point list based on the feature points, and recognizing actual feature points based on the first feature point list and the second feature point list, and a position variation measurement unit for measuring variation in positions of the cameras based on variation in relative positions of the actual feature points.

18 Claims, 15 Drawing Sheets

(56) References Cited

U.S. PATENT DOCUMENTS

| | | |
|---|---|---|
| 2009/0210092 A1 | 8/2009 | Park et al. |
| 2010/0160835 A1 | 6/2010 | Shin et al. |
| 2016/0093058 A1* | 3/2016 | Moteki .................... G06T 7/73 |
| | | 382/154 |

* cited by examiner

APPARATUS AND METHOD FOR MEASURING POSITION OF STEREO CAMERA

CROSS REFERENCE TO RELATED APPLICATION

This application claims the benefit of Korean Patent Application No 10-2015-0091444, filed Jun. 26, 2015, which is hereby incorporated by reference in its entirety into this application.

BACKGROUND OF THE INVENTION

1. Technical Field

The present invention relates generally to technology for measuring the position of a stereo camera composed of two cameras in real time using feature points installed on an object.

2. Description of the Related Art

Technologies for calculating in real time the position of a stereo camera by observing feature points present in space using the stereo camera have been widely used in the academic world and the industrial world, including a three-dimensional (3D) scanner, a mobile robot, and a human-computer interface. Among these technologies, technology for calculating the position of a camera using randomly arranged feature points without previously knowing the positions of the feature points may be regarded as being highly useful due to the convenience of construction. Among these technologies, technology that requires a texture around feature points, which enables the feature points in sequentially input images to be distinguished from each other, may be utilized when feature points that are present in the texture of the original background are used without requiring feature points to be intentionally arranged. However, when there is an insufficient texture and feature points arranged by a user are used, there is inconvenience in which an identifiable texture or individual identification markers must be additionally arranged around the feature points. In conventional technology, there is a method for detecting, as the characteristics of only respective feature points, distances to neighboring feature points based on the 3D positions of the feature points, which are reconstructed via triangulation using stereo images, thus distinguishing the feature points. However, there may occur the case where it is ambiguous to distinguish such feature points using only this method.

U.S. Pat. No. 7,925,049 discloses technology for receiving images of a stereo camera, distinguishing feature points from each other using the background texture of the images, and tracking the images.

However, the technology of U.S. Pat. No. 7,925,049 is fatally disadvantageous in that it is impossible to precisely distinguish feature points unless a background texture is present.

Therefore, there is a need for technology that precisely distinguishes feature points from each other without using a texture or the like, present in a background, and measures the position of the camera based on the feature points.

SUMMARY OF THE INVENTION

Accordingly, the present invention has been made keeping in mind the above problems occurring in the prior art, and an object of the present invention is to measure the position of a stereo camera based on the positions of feature points present in multiple frames.

Another object of the present invention is to measure variation in the position of a camera using only feature points without requiring a texture around feature points or individual identification marks.

A further object of the present invention is to simply measure variation in the position of a camera, thus enabling the measurement of position variation to be easily applied to 3D object scanning devices.

In accordance with an aspect of the present invention to accomplish the above objects, there is provided an apparatus for measuring a position of a camera, including a feature point extraction unit for extracting feature points from images respectively captured by a first camera and a second camera and generating a first feature point list based on the feature points; a feature point recognition unit for extracting feature points from images captured by the cameras after the cameras have moved, generating a second feature point list based on the feature points, and recognizing actual feature points based on the first feature point list and the second feature point list; and a position variation measurement unit for measuring variation in positions of the cameras based on the actual feature points.

The feature point extraction unit may include an epipolar line generation unit for generating epipolar lines corresponding to respective feature points in the image captured by the first camera; and an extraction unit for extracting feature points corresponding to the epipolar lines from the image captured by the second camera.

The extraction unit may measure distances from the feature points in the image captured by the second camera to the epipolar lines, and extracts feature points, from which distances to the epipolar lines are less than or equal to a specific distance.

The feature point recognition unit may include a coordinate extraction unit for extracting 3D position coordinates corresponding to respective feature points present in the first feature point list and the second feature point list; a distance measurement unit for measuring distances between the feature points based on the 3D position coordinates; and a recognition unit for searching for feature points present in the second feature point list that are identical to the feature points present in the first feature point list based on the measured distances, and recognizing found feature points as actual feature points.

The recognition unit may be configured to, if feature points, from which distances to the feature points present in the first feature point list are less than or equal to a specific distance, are present in the second feature point list, recognize the feature points present in the first feature point list as the actual feature points.

The recognition unit may recognize the actual feature points using Random Sample Consensus (RANSAC).

The recognition unit may include a rigid transformation calculation unit for calculating rigid transformations of respective feature points present in the first feature point list, based on the feature points present in the first feature point list and feature points present in the second feature point list that are located at a distance less than or equal to a specific distance from the feature points present in the first feature point list; and a feature point recognition unit for recognizing the actual feature points based on the rigid transformations.

The feature point recognition unit may recognize feature points that have highest consistency in rigid transformations and are present in the second feature point list as actual feature points.

The position measurement unit may include a calculation unit for calculating a rotation matrix and a translation vector based on the actual feature points; a rigid transformation calculation unit for calculating rigid transformations based on the rotation matrix and the translation vector; and a position variation measurement unit for measuring variation in positions of the first and second cameras based on the rigid transformations.

In accordance with another aspect of the present invention to accomplish the above objects, there is provided a method for measuring a position of a camera, including extracting feature points from images respectively captured by a first camera and a second camera and generating a first feature point list based on the feature points; extracting feature points from images captured by the cameras after the cameras have moved, generating a second feature point list, and extracting actual feature points based on the first feature point list and the second feature point list; and measuring variation in positions of the cameras based on the actual feature points.

Generating the first feature point list may include generating epipolar lines corresponding to respective feature points in the image captured by the first camera; and extracting feature points corresponding to the epipolar lines from the image captured by the second camera.

Generating the first feature point list may include measuring distances from the feature points in the image captured by the second camera to the epipolar lines, and extracting feature points, from which distances to the epipolar lines are less than or equal to a specific distance.

Recognizing the actual feature points may include extracting 3D position coordinates corresponding to respective feature points present in the first feature point list and the second feature point list; measuring distances between the feature points based on the 3D position coordinates; and searching for feature points present in the second feature point list that are identical to the feature points present in the first feature point list based on the measured distances, and recognizing found feature points as actual feature points.

Recognizing the actual feature points may be configured to, if feature points, from which distances to the feature points present in the first feature point list are less than or equal to a specific distance, are present in the second feature point list, recognize the feature points having the distances less than or equal to the specific distance as the actual feature points.

Recognizing the actual feature points may be configured to recognize the actual feature points using Random Sample Consensus (RANSAC).

Recognizing the actual feature points may include calculating rigid transformations of respective feature points present in the first feature point list, based on the feature points present in the first feature point list and feature points present in the second feature point list that are located at a distance less than or equal to a specific distance from the feature points present in the first feature point list, and determining actual feature points based on the rigid transformations.

Recognizing the actual feature points may be configured to recognize feature points that have highest consistency in rigid transformations and are present in the second feature point list as actual feature points.

Measuring the variation in the positions of the first camera and the second camera may include calculating a rotation matrix and a translation vector based on the actual feature points; calculating rigid transformations based on the rotation matrix and the translation vector; and measuring variation in positions of the first and second cameras based on the rigid transformations.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
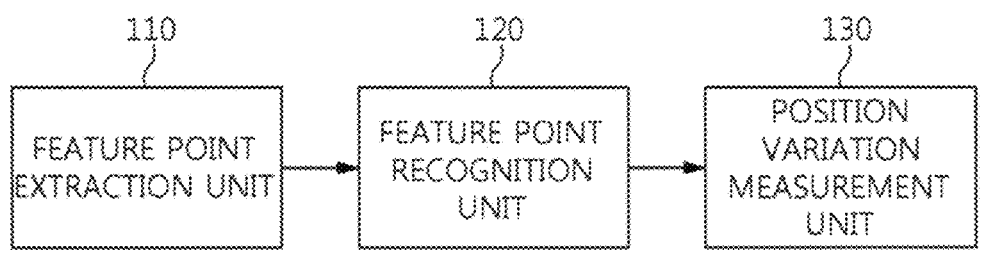
FIG. 1 is a block diagram showing an apparatus for measuring the position of a camera according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a block diagram showing an apparatus for measuring the position of a camera according to an embodiment of the present invention.

Referring to FIG. 1, the camera position measurement apparatus according to the embodiment of the present invention includes a feature point extraction unit 110, a feature point recognition unit 120, and a position variation measurement unit 130.

The feature point extraction unit 110 extracts feature points from images respectively captured by a first camera and a second camera, and generates a first feature point list.

Here, the first camera and the second camera may be cameras provided inside the camera position measurement apparatus.

The feature points may be specific points having a predetermined area so that the feature points are extracted from the images.

In this case, the feature points may be specific points attached to an object in the images captured by the cameras. For example, the feature points are circular figures attached to the object shown in FIGS. 5 to 8.

Here, the shapes of feature points are not especially limited. Further, the shapes of feature points may be identical to each other, but may also be different from each other. When conventional technology is used, it is difficult to measure the position of the camera when the shapes of feature points are identical to each other, but the present invention may be used to easily measure the position of the camera even if the shapes of the feature points are identical to each other.

Here, the first feature point list may denote a set of feature points which are present in an image captured by the second camera and which correspond to one of the feature points in the image captured by the first camera.

For the first feature point list, a description will be made with reference to FIGS. 7 and 8. When feature points intersecting epipolar lines among the feature points extracted in FIG. 8 are PR, a feature point pair (PL, PR) is added to a corresponding point candidate list. Actually, the corresponding feature points do not exactly intersect epipolar lines due to a correction error and a feature point extraction error. Accordingly, when the number of feature points falling within the range of a specific distance threshold on the epipolar lines is assumed to be M, a list of feature point pairs (PL, PRO may be generated for all feature points PRi, where i=1 to M, and a set of feature point pairs may be the first feature point list.

Here, when the first feature point list is generated, a first feature point list including all feature points in the image captured by the first camera may be generated.

The feature points in the image captured by the second camera, which correspond to the feature points in the image captured by the first camera, may generate epipolar lines using the feature points in the image captured by the first camera, and may denote the feature points in the image captured by the second camera, which correspond to the epipolar lines.

Here, the feature points in the image captured by the second camera, which correspond to the epipolar lines, may also denote feature points intersecting the epipolar lines.

Since the feature points may not intersect the epipolar lines due to the internal correction error and the feature point extraction error of the cameras, feature points that do not intersect the epipolar lines, but have distances to the epipolar lines, less than or equal to a specific distance, may be recognized as feature points corresponding to the feature points in the image captured by the first camera.

The feature point recognition unit 120 moves the cameras, extracts feature points from images captured by the moved cameras, generates a second feature point list, and recognizes actual feature points based on the first feature point list and the second feature point list.

Here, the method of generating the second feature point list is identical to the method of generating the first feature point list.

The second feature point list may be generated using the images captured by the cameras after the cameras have moved.

The feature points included in the second feature point list may be identical to those included in the first feature point list, may include new additional feature points, or may omit feature points that were included in the first feature point list. The reason for this is that the images are captured by the cameras while the cameras are moving, and thus an image captured before movement is different from an image captured after movement. In greater detail, when each camera captures images at different angles while moving, feature points that could not be captured in a previous image may be captured in a current image, and feature points that were captured in a previous image may not be captured by the lens on the camera when viewed from another angle.

In this case, the actual feature points may be feature points that are present both in the first feature point list and in the second feature point list.

Here, when the actual feature points are recognized, the feature points present in the first feature point list and the second feature point list may be extracted as 3D position coordinates, respectively. When attempting to extract 3D position coordinates, the 3D position coordinates may be extracted based on the first camera or the second camera.

In this case, the distances between feature points may be measured based on the extracted 3D position coordinates, and the feature points in the second feature point list that correspond to feature points in the first feature point list may be found based on the measured distances. The feature points in the second feature point list may be extracted as the actual feature points.

The feature points, the distances between which are calculated as values less than or equal to a specific distance value, may be extracted as the actual feature points.

Here, when feature points are extracted as the actual feature points, error may be reduced using Random Sample Consensus (RANSAC).

When the actual feature points are extracted, recent contact points among the feature points of the second feature point list are obtained for respective feature points of the first feature point list, rigid transformations are calculated for the recent contact points, and actual feature points may be extracted based on whether the rigid transformations have the same transformation relationship between the contact points.

The position variation measurement unit 130 measures variation in the positions of the cameras based on the actual feature points.

A detailed description of the position variation measurement unit 130 will be made later with reference to FIG. 4.

Figure 2:
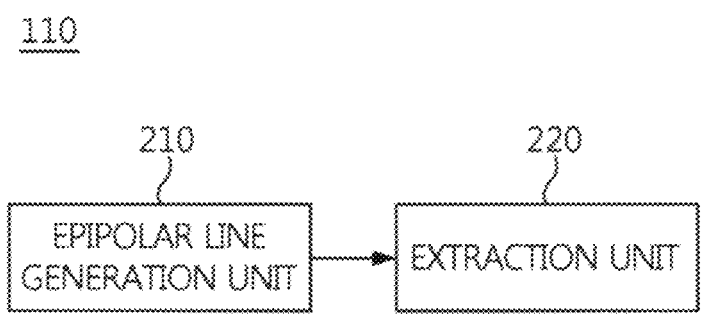
FIG. 2 is a block diagram showing the feature point extraction unit shown in FIG. 1.

FIG. 2 is a block diagram showing the feature point extraction unit shown in FIG. 1.

Referring to FIG. 2, the feature point extraction unit 110 includes an epipolar line generation unit 210 and an extraction unit 220.

The epipolar line generation unit 210 generates epipolar lines corresponding to respective feature points in an image captured by the first camera.

Epipolar lines denote lines passing through epipoles in stereo vision fields. Since a description thereof is well known to those skilled in the art to which the present invention pertains, it will be omitted here.

The extraction unit 220 extracts feature points corresponding to the epipolar line from an image captured by the second camera.

Here, the extraction unit 220 measures distances between the feature points in the image captured by the second camera and the epipolar lines, and may extract feature points, from which the distances to the epipolar lines are less than or equal to a specific distance, as feature points.

When there are multiple feature points in the image captured by the first camera, the extraction unit 220 may perform a task of extracting feature points based on measured distances between the epipolar lines corresponding to respective feature points and the feature points in the image captured by the second camera.

Figure 3:
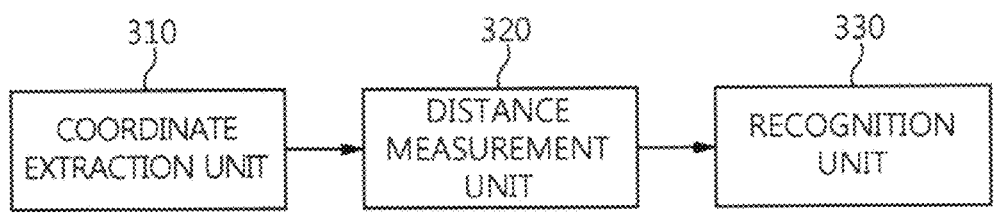
FIG. 3 is a block diagram showing the feature point recognition unit shown in FIG. 1.

FIG. 3 is a block diagram showing the feature point recognition unit 120 shown in FIG. 1.

Referring to FIG. 3, the feature point recognition unit 120 includes a coordinate extraction unit 310, a distance measurement unit 320, and a recognition unit 330.

The coordinate extraction unit 310 extracts 3D position coordinates of respective feature points present in a first feature point list and in a second feature point list.

The distance measurement unit 320 measures the distances between the feature points present in the first feature point list and the feature points present in the second feature point list, based on the 3D position coordinates.

Here, the measurement of the distances means that the distance between any one of the feature points present in the first feature point list and any one of the feature points present in the second feature point list, rather than the distance between the feature points present in the first feature point list or the distance between the feature points present in the second feature point list, is measured.

The recognition unit 330 individually searches for feature points that are present in the second feature point list and are identical to the feature points present in the first feature point list, based on the measured distances, and recognizes the identical feature points as actual feature points if the identical feature points are found in the second feature point list.

Here, the actual feature points may be feature points that are present both in the first feature point list and the second feature point list.

When the actual feature points are recognized, the feature points present in the first feature point list and the second feature point list may be extracted as respective 3D position coordinates. When 3D position coordinates are extracted, they may be extracted based on either the first camera or the second camera.

Here, the distances between feature points may be measured based on the extracted 3D position coordinates. Feature points in the second feature point list, which correspond to the feature points in the first feature point list, may be found based on the measured distances, and the feature points present in the second feature point list may be extracted as actual feature points.

The feature points, the distances between which are calculated as being less than or equal to a specific value, may be extracted as actual feature points.

In this case, the actual feature points may also be extracted in such a way as to generate multiple frames by performing capturing using the first camera and the second camera, extract actual feature points between respective frames, assign numbers to the actual feature points, and assign the same number to the same feature points. In this case, the actual feature points are extracted using multiple frames, and thus precision is improved.

Figure 4:
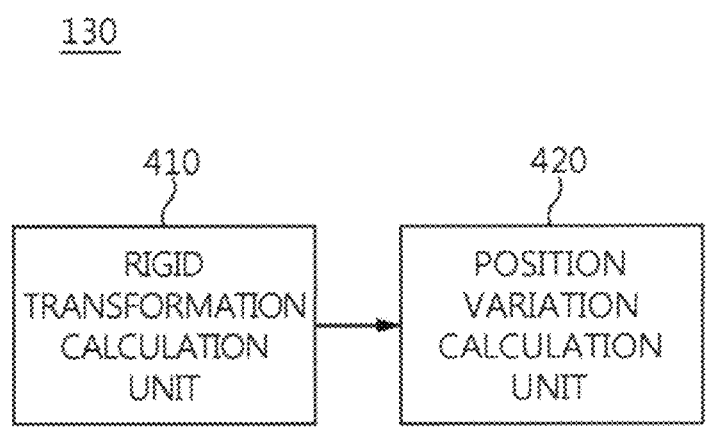
FIG. 4 is a block diagram showing the position variation measurement unit shown in FIG. 1.

FIG. 4 is a block diagram showing the position variation measurement unit shown in FIG. 1.

Referring to FIG. 4, the position variation measurement unit 130 includes a rigid transformation calculation unit 410 and a position variation calculation unit 420.

The rigid transformation calculation unit 410 calculates a rotation matrix and a translation vector, based on extracted actual feature points.

Here, the rotation matrix and the translation vector may be calculated by comparing a reference frame with the current frame.

A start frame, in which an image is initially input to a stereo device, may be set as a reference frame. The rotation matrix and the translation vector of the coordinate system of the start frame may be set as a unit matrix and a zero vector, respectively.

There is no limitation as to the method for setting the reference frame. However, when the number of identical feature points between the current frame and the reference frame is found to be equal to or greater than a specific number by comparing the number of identical feature points between the current frame and the reference frame, the current frame is set as the reference frame, and then a rotation matrix and a translation vector may be calculated.

Here, when the number of actual feature points that are identical between the reference frame and the current frame is less than the specific number, a subsequent frame is set as the reference frame. Further, the number of actual feature points that are identical may again be compared with the specific number.

The specific number is not especially limited. It is preferable that the specific number is equal to or greater than 3, but it is not limited thereto.

Here, the scheme for calculating the rigid transformations between the reference frame and the current frame is not especially limited. For example, the three points that are farthest away from a 3D point in the reference frame are obtained. The center of gravity of the three points is calculated and is designated as c0. Then, vectors from the center of gravity to the three points are designated as p0, q0, and r0, respectively. x0, y0, and z0 are obtained using the following Equation (1):

$$x0 = p0/\|p0\|$$
$$b0 = q0/\|q0\|$$
$$z0 = b0 \times x0$$
$$y = z0 \times x0 \qquad (1)$$

In this case, x1, y1, and z1 may be obtained for the current frame using the same method as that given in Equation (1).

Here, the rotation matrix (Re) and the translation vector (te) may be obtained using the following Equation (2):

$$Re = [x1 y1 z1] [x0 y0 z0]^{-1}$$
$$te = -[x1 y1 z1] [x0 y0 z0]^{-1} c0 + c1 \qquad (2)$$

The rotation matrix and the translation vector for the rigid transformations may be stored and loaded for each frame.

The results of the rigid transformations obtained using Equation (2) may be used as initial values of the nonlinear optimization calculation in order to obtain more precise results.

The cost function of the nonlinear optimization calculation is represented by the following Equation (3):

$$\sum_{i=1}^{N} \|RcXri + tc - Xci\|^2 \quad (3)$$

where N denotes the number of 3D points common to both the reference frame and the current frame, Rc denotes the rotation matrix corresponding to the rigid transformations between the reference frame and the current frame, tc denotes the translation vector corresponding to the rigid transformation between the reference frame and the current frame. Xri denotes the coordinates of 3D feature points, common to both the reference frame and the current frame, in the reference frame, and Xci denotes the coordinates of 3D feature points, common to both the reference frame and the current frame, in the current frame.

Here, for the nonlinear optimization procedure, any type of nonlinear optimization method developed in optimization fields may be used.

Further, estimated values may be refined based on observed values, and thus more precise results may be obtained. With the exception of virtual points for which the succession of numbers does not continue for a predetermined frame or longer, the coordinates of remaining feature points on the image captured by the left camera and the image captured by the right camera are used as the measured values. The reconstructed points in 3D space and the calculated positional values of the stereo camera for the respective frames are used as initial estimated values, after which more precise results may be extracted using bundle adjustment. Points in 3D space that have very short spatial distances less than or equal to a predetermined threshold therebetween are regarded as identical points and are subjected to bundle adjustment, thus suppressing the drift of the points.

The position variation calculation unit 420 integrates the rigid transformations obtained by the rigid transformation calculation unit 410 with a rigid transformation composed of a rotation matrix and a translation vector in the coordinate system of the reference frame, and then obtains the current position of the stereo camera based on the coordinate system of the start frame.

Figure 5:
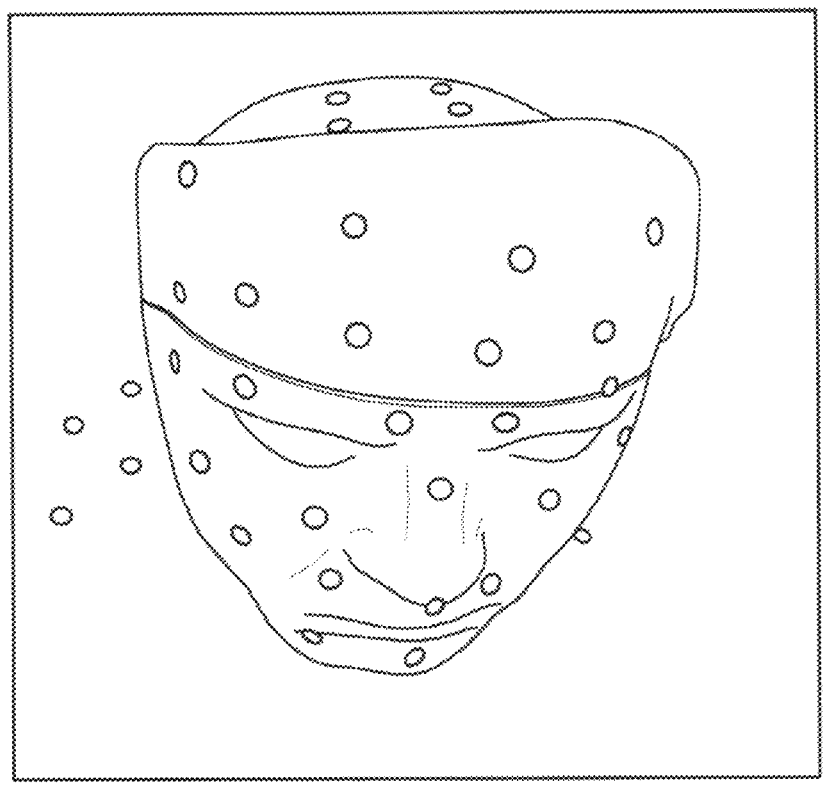
FIGS. 5 and 6 are diagrams showing feature points used by the camera position measurement apparatus according to an embodiment of the present invention.
Figure 6:
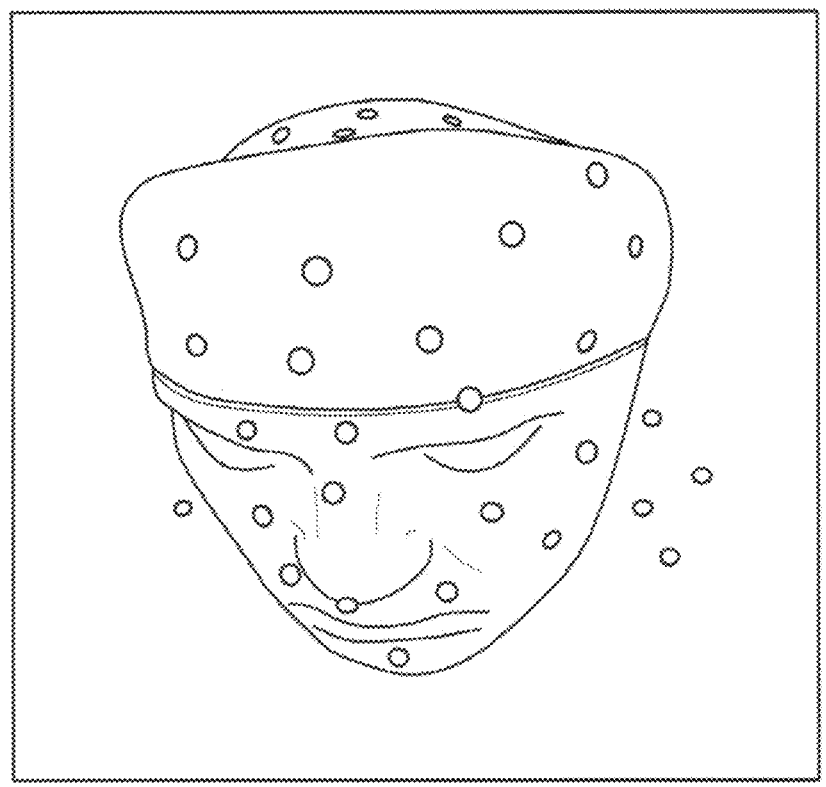

FIGS. 5 and 6 are diagrams showing feature points used by the camera position measurement apparatus according to an embodiment of the present invention.

FIG. 5 is a diagram showing an object captured by a first camera and FIG. 6 is a diagram showing an object captured by a second camera.

Feature points may be attached to the object. Referring to FIGS. 5 and 6, it can be seen that feature points are attached to the outside of the object.

Here, the first camera and the second camera may be cameras provided in the camera position measurement apparatus.

The feature points may be specific points having a predetermined area so that the feature points are extracted from the images.

In this case, the feature points may be specific points attached to an object in the images captured by the cameras. For example, the feature points are circular figures attached to the object shown in FIGS. 5 to 8.

Here, the shapes of feature points are not especially limited. Further, the shapes of feature points may be identical to each other, but may also be different from each other. When conventional technology is used, it is difficult to measure the position of the camera when the shapes of feature points are identical to each other, but the present invention may be used to easily measure the position of the camera even if the shapes of the feature points are identical to each other.

Figure 7:
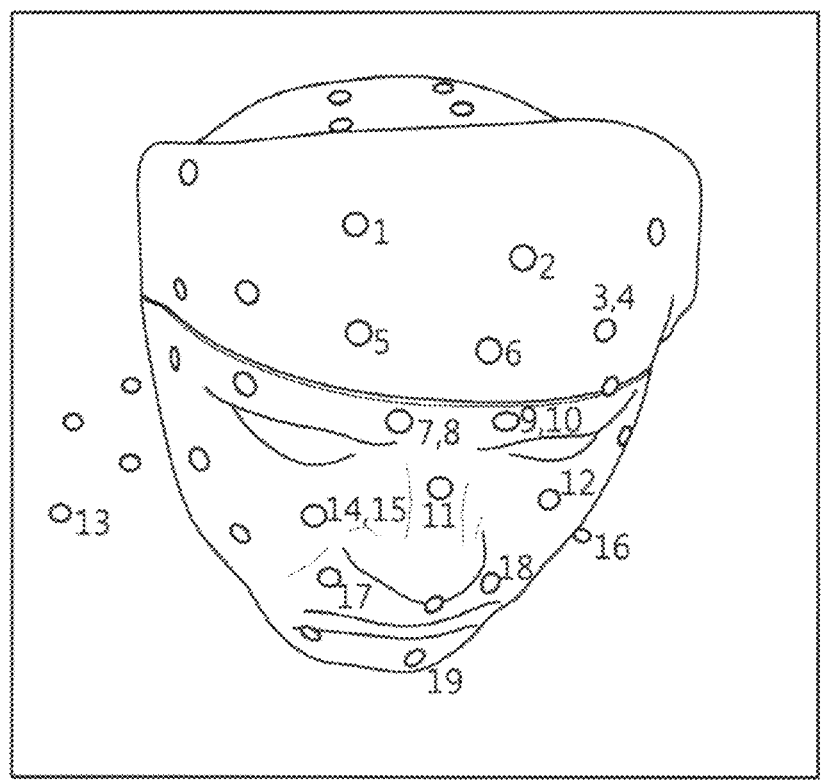
FIGS. 7 and 8 are diagrams showing the procedure in which the feature point extraction unit shown in FIG. 1 extracts feature points using epipolar lines.
Figure 8:
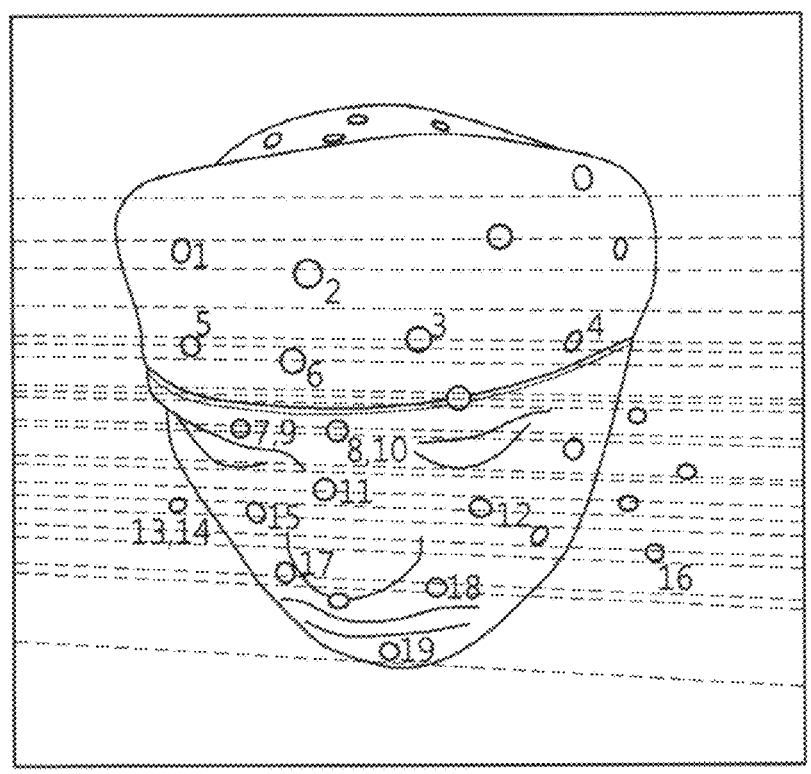

FIGS. 7 and 8 are diagrams showing the procedure in which the feature point extraction unit shown in FIG. 1 extracts feature points using epipolar lines.

Referring to FIG. 7, it can be seen that numbers are assigned to feature points in an image captured by the first camera.

Referring to FIG. 8, it can be seen that the numbers of the feature points in the image captured by the first camera are assigned to respective feature points in the image captured by the second camera.

In this case, feature points in the captured image shown in FIG. 8 that correspond to the feature points in the image shown in FIG. 7 may generate epipolar lines using the feature points in the image shown in FIG. 7, and may denote the feature points in the image shown in FIG. 8, which correspond to the epipolar lines.

Here, the feature points in the image shown in FIG. 8 that correspond to the epipolar lines may also be feature points that intersect the epipolar lines.

Since the feature points may not intersect the epipolar lines due to the internal correction error and the feature point extraction error of the cameras, feature points that do not intersect the epipolar lines, but have distances to the epipolar lines, less than or equal to a specific distance, may be recognized as feature points corresponding to the feature points in the image shown in FIG. 7.

Figure 9:
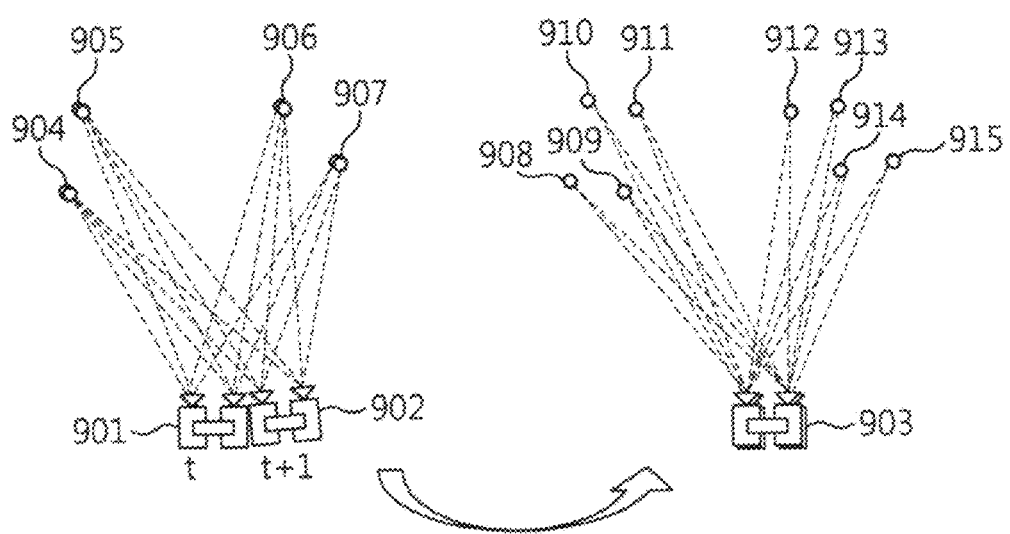
FIG. 9 is a diagram showing feature points measured by the camera position measurement apparatus while moving according to an embodiment of the present invention.

FIG. 9 is a diagram showing feature points measured by the camera position measurement apparatus while moving according to an embodiment of the present invention.

Referring to FIG. 9, camera position measurement apparatuses 901 to 903 according to an embodiment of the present invention and feature points 904 to 915 are illustrated.

The camera position measurement apparatus 901 indicates the position of the camera position measurement apparatus at time t, and the camera position measurement apparatus 902 indicates the position of the camera position measurement apparatus at time t+1. The camera position measurement apparatus 903 illustrates the cases where the positions of feature points, measured when the measurement apparatuses 901 and 902 are superimposed on each other, are measured differently. That is, the drawing shows that, while the camera position measurement apparatus is moving, the relative positions of the feature points 904 to 907 are varied as the reference (camera position measurement apparatus) of a relative coordinate system is changed.

That is, since the feature points 908 and 909 shown on the right side of FIG. 9 are located relatively close to each other, the feature points 908 and 909 are considered to be the same feature point 904, and may also be regarded as an actual feature point. The remaining feature points 905 to 907 and 910 to 915 may be considered in the same manner.

Figure 10:
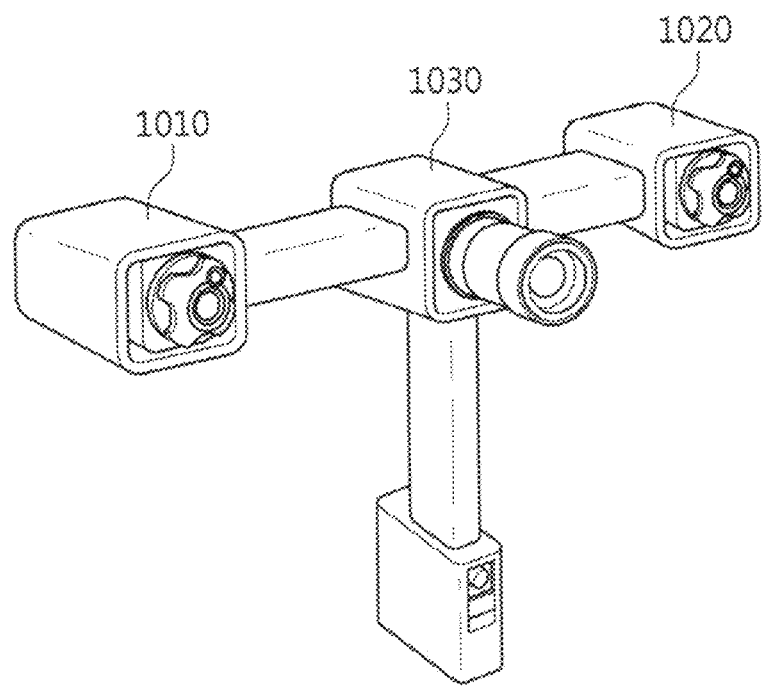
FIGS. 10 and 11 are diagrams showing applications of the apparatus for measuring the position of a camera according to an embodiment of the present invention.
Figure 11:
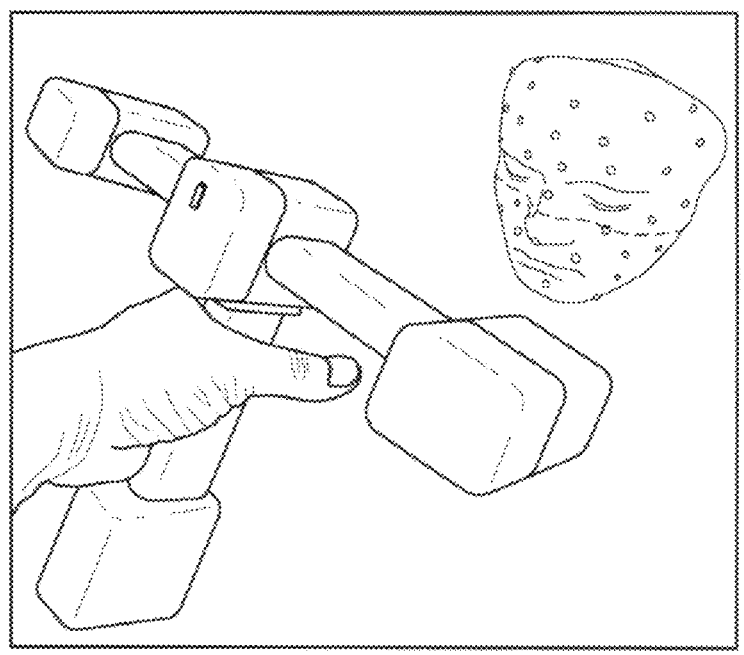
Figure 12:
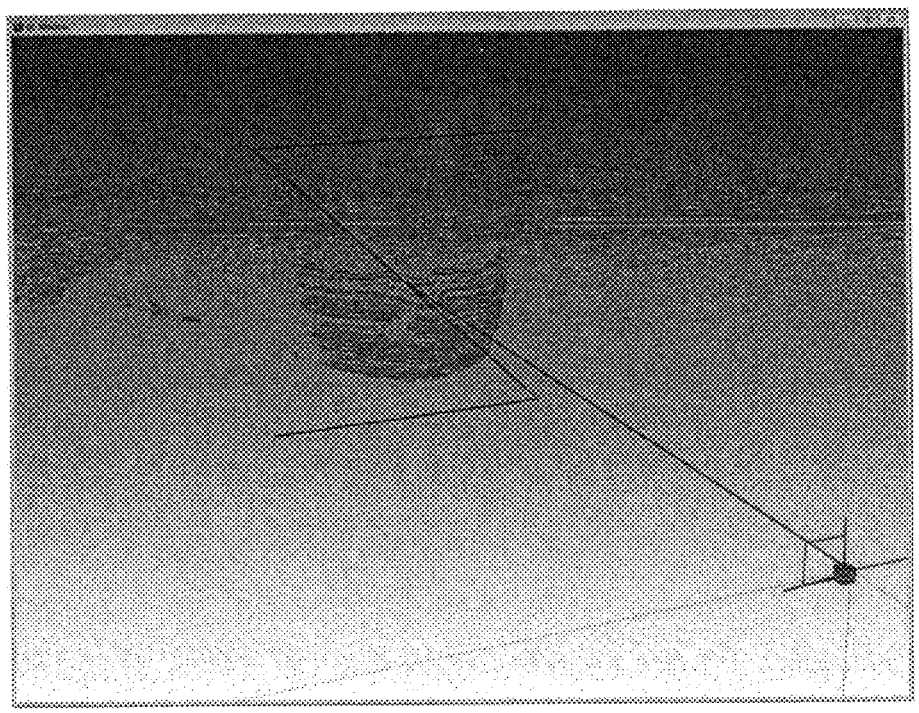
FIG. 12 is a diagram showing the scanning of an object using the camera position measurement apparatus according to an embodiment of the present invention.

FIGS. 10 to 12 are diagrams showing applications of the camera position measurement apparatus according to embodiments of the present invention.

FIG. 10 illustrates a system in which the camera position measurement apparatus is applied and attached to a scanner, wherein the system includes a first camera 1010, a second camera 1020, and a laser 1030.

FIG. 11 is a diagram showing the state in which the camera position measurement apparatus according to the embodiment of the present invention is applied to a 3D object scanner and scans an object. It can be seen from FIG.

11 that the camera position measurement apparatus according to the embodiment of the present invention may measure the position of the camera and then be applied to the 3D object scanner.

When feature markers are attached to an object corresponding to a scan target, and the object is captured by a stereo camera while the stereo camera is moving, the stereo camera may function as a position recognition sensor.

Here, when a laser line scanner composed of a camera and a line laser is mounted, 3D scan information may be extracted for the laser line of each frame. When a set of 3D points corresponding to such scan results is called X(t), and a positional value measured by the stereo camera is represented by a rotation matrix R(t) and a translation vector t(t), a start frame coordinate system Xw may be represented by the following Equation (4):

$$Xw(t)=R(t)[RsX(t)+ts]+t(t) \quad (4)$$

where Rs denotes a rotation matrix indicating the coordinate conversion relationship between the laser line scanner and the left camera of the stereo camera, and ts denotes a translation vector indicating the coordinate conversion relationship between the laser line scanner and the left camera of the stereo camera.

FIG. 12 is a diagram showing the results obtained by applying the camera position measurement apparatus of the embodiment of the present invention to a 3D object scanner and then scanning an object.

FIG. 12 illustrates the results of scanning an object based on the results of the combination of Xw(t) shown in FIG. 11 in space.

Figure 13:
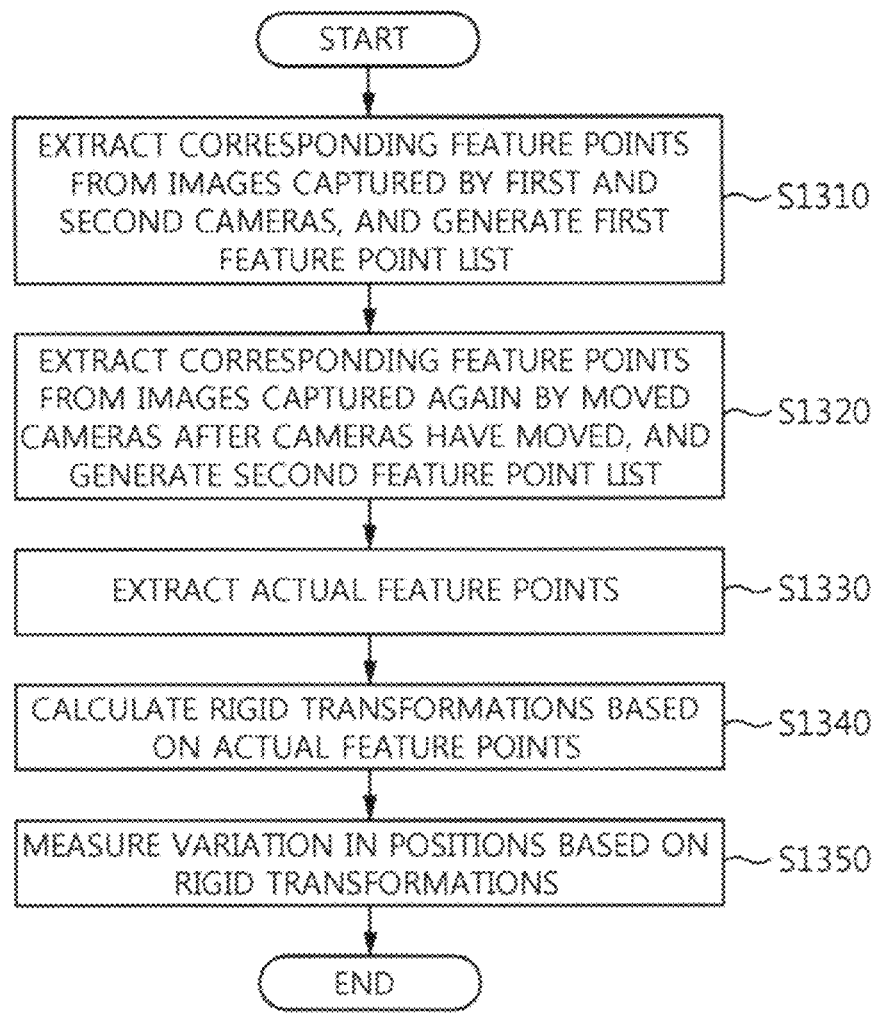
FIG. 13 is an operation flowchart showing a method for measuring the position of a camera according to an embodiment of the present invention.

FIG. 13 is an operation flowchart showing the method for measuring the position of a camera according to an embodiment of the present invention.

Referring to FIG. 13, corresponding feature points are extracted from images captured by a first camera and a second camera, and a first feature point list is generated at step S1310.

Here, the first camera and the second camera may be cameras provided inside the camera position measurement apparatus.

The feature points may be specific points having a predetermined area so that the feature points are extracted from the images.

In this case, the feature points may be specific points attached to an object in the images captured by the cameras. For example, the feature points are circular figures attached to the object shown in FIGS. 5 to 8.

Here, the shapes of feature points are not especially limited. Further, the shapes of feature points may be identical to each other, but may also be different from each other. When conventional technology is used, it is difficult to measure the position of the camera when the shapes of feature points are identical to each other, but the present invention may be used to easily measure the position of the camera even if the shapes of the feature points are identical to each other.

Here, the first feature point list may denote a set of feature points which are present in an image captured by the second camera and which correspond to one of the feature points in the image captured by the first camera.

For the first feature point list, a description will be made with reference to FIGS. 7 and 8. When feature points intersecting epipolar lines among the feature points extracted in FIG. 8 are PR, a feature point pair (PL, PR) is added to a corresponding point candidate list. Actually, the corresponding feature points do not exactly intersect epipolar lines due to a correction error and a feature point extraction error. Accordingly, when the number of feature points falling within the range of a specific distance threshold on the epipolar lines is assumed to be M, a list of feature point pairs (PL, PRi) may be generated for all feature points PRi, where i=1 to M, and a set of feature point pairs may be the first feature point list.

Here, when the first feature point list is generated, a first feature point list including all feature points in the image captured by the first camera may be generated.

The feature points in the image captured by the second camera, which correspond to the feature points in the image captured by the first camera, may generate epipolar lines using the feature points in the image captured by the first camera, and may denote the feature points in the image captured by the second camera, which correspond to the epipolar lines.

Here, the feature points in the image captured by the second camera, which correspond to the epipolar lines, may also denote feature points intersecting the epipolar lines.

Since the feature points may not intersect the epipolar lines due to the internal correction error and the feature point extraction error of the cameras, feature points that do not intersect the epipolar lines, but have distances to the epipolar lines less than or equal to a specific distance, may be recognized as feature points corresponding to the feature points in the image captured by the first camera.

Further, corresponding feature points are extracted from images captured again by the cameras after the cameras have moved, and a second feature point list is generated at step S1320.

Here, the method of generating the second feature point list is identical to the method of generating the first feature point list.

The second feature point list may be generated using the images captured by the cameras after the cameras have moved.

The feature points included in the second feature point list may be identical to those included in the first feature point list, may include new additional feature points, or may omit feature points that were included in the first feature point list. The reason for this is that the images are captured by the cameras while the cameras are moving, and thus an image captured before movement is different from an image captured after movement. In greater detail, when each camera captures images at different angles while moving, feature points that could not be captured in a previous image may be captured in a current image, and feature points that were captured in a previous image may not be captured by the lens on the camera when viewed from another angle.

Further, actual feature points are extracted at step S1330.

In this case, the actual feature points may be feature points that are present both in the first feature point list and in the second feature point list.

Here, when the actual feature points are recognized, the feature points present in the first feature point list and the second feature point list may be extracted as 3D position coordinates, respectively. When attempting to extract 3D position coordinates, the 3D position coordinates may be extracted based on the first camera or the second camera.

In this case, the distances between feature points may be measured based on the extracted 3D position coordinates, and the feature points in the second feature point list that correspond to feature points in the first feature point list may be found based on the measured distances. The feature points in the second feature point list may be extracted as the actual feature points.

The feature points, the distances between which are calculated as values less than or equal to a specific distance value, may be extracted as the actual feature points.

Here, when feature points are extracted as the actual feature points, error may be reduced using Random Sample Consensus (RANSAC).

When the actual feature points are extracted, recent contact points among the feature points of the second feature point list are obtained for respective feature points of the first feature point list, rigid transformations are calculated for the recent contact points, and actual feature points may be extracted based on whether the rigid transformations have the same transformation relationship between the contact points.

Further, rigid transformations are calculated based on the actual feature points at step S1340.

Here, a rotation matrix and a translation vector are calculated based on the extracted actual feature points.

The rotation matrix and the translation vector may be calculated by comparing a reference frame with a current frame.

There is no limitation as to the method for setting the reference frame. However, when the number of identical feature points between the current frame and the reference frame is found to be equal to or greater than a specific number by comparing the number of identical feature points between the current frame and the reference frame, the current frame is set as the reference frame, and then a rotation matrix and a translation vector may be calculated.

Here, when the number of actual feature points that are identical between the reference frame and the current frame is less than the specific number, a subsequent frame is set as the reference frame. Further, the number of actual feature points that are identical may again be compared with the specific number.

The specific number is not especially limited. It is preferable that the specific number is equal to or greater than 3, but it is not limited thereto.

Here, the scheme for calculating the rigid transformations between the reference frame and the current frame is not especially limited. For example, the three points that are farthest away from a 3D point in the reference frame are obtained. The center of gravity of the three points is calculated and is designated as c0. Then, vectors from the center of gravity to the three points are designated as p0, q0, and r0, respectively, x0, y0, and z0 are obtained using the following Equation (1):

$$x0 = p0/\|p0\|$$

$$b0 = q0/\|q0\|$$

$$z0 = b0 \times x0$$

$$y = z0 \times x0 \quad (1)$$

Next, for the current frame, x1, y1, and z1 may be obtained using the same method as that given in Equation (1).

Finally, a rotation matrix (Re) and a translation vector (te) may be obtained using the following Equation (2).

$$Re = [x1 y1 z1] \mathbf{I} [x0 y0 z0]^{-1}$$

$$te = -[x1 y1 z1] \mathbf{I} [x0 y0 z0]^{-1} c0 + c1 \quad (2)$$

Further, variation in the positions of the cameras is measured based on the rigid transformations at step S1350.

Figure 14:
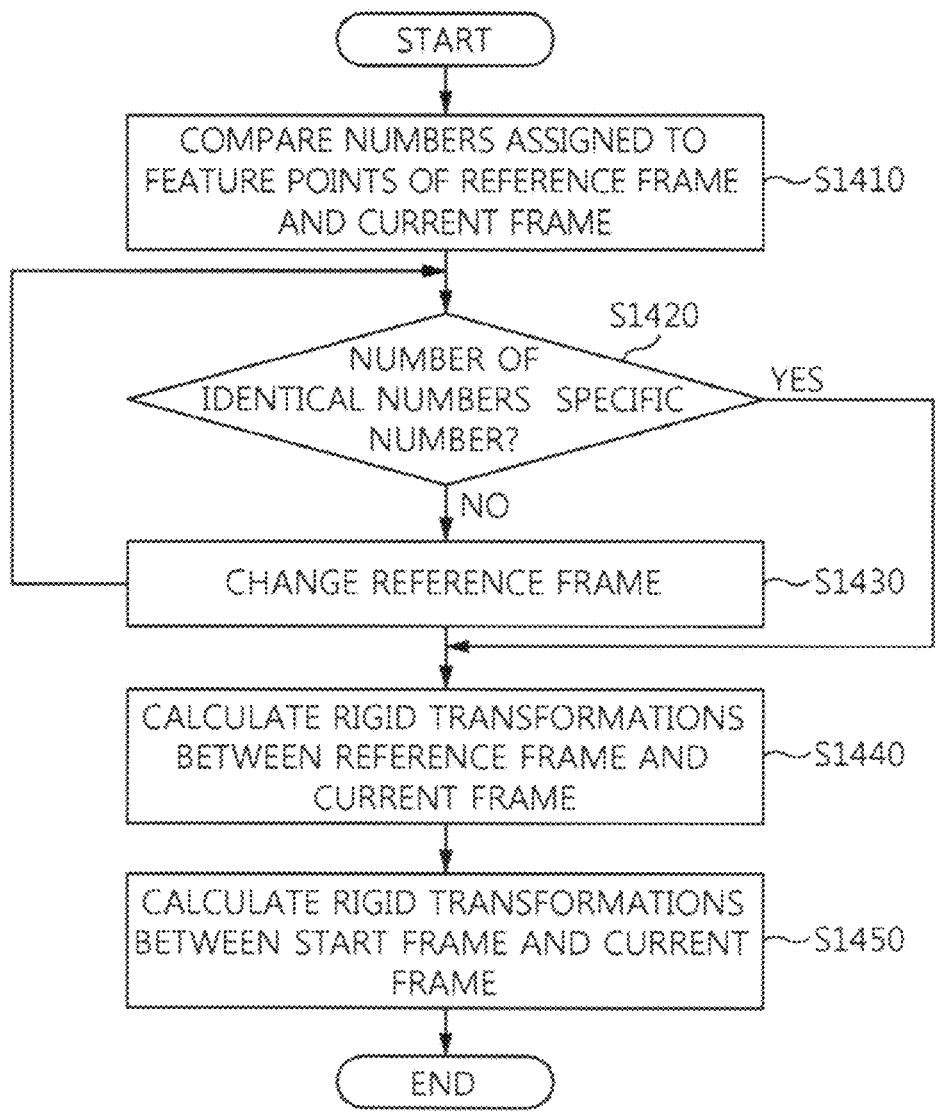
FIG. 14 is an operation flowchart showing in detail the step of calculating rigid transformations based on actual feature points, shown in FIG. 13.

FIG. 14 is an operation flowchart showing in detail the step of calculating rigid transformations based on the actual feature points shown in FIG. 13.

Referring to FIG. 14, numbers assigned to the feature points of a reference frame and a current frame are compared with each other at step S1410.

When the feature points present in the reference frame and the current frame are identical to each other, the numbers assigned thereto are also identical to each other.

Further, whether the number of identical numbers is equal to or greater than a specific number is determined at step S1420. If it is determined that the number of identical numbers is less than the specific number, the reference frame is changed at step S1430.

Here, the specific number is not especially limited. It is preferable that the specific number is equal to or greater than 3, but it is not limited thereto.

Further, when the number of identical numbers is equal to or greater than the specific number, rigid transformations between the reference frame and the current frame are calculated at step S1440.

In this case, the rigid transformations may be calculated based on the variation in the positions of the feature points using the identical feature points.

The method of calculating the rigid transformations has been described in detail with reference to FIG. 13.

Further, the rigid transformations between the start frame and the current frame are calculated at step S1450.

Here, the rigid transformations may be calculated based on the variation in the positions of feature points using the identical feature points.

Accordingly, the present invention may observe feature points using a stereo camera, and simply measure the position of the camera based on the positions of feature points present in multiple frames.

Further, the present invention measures the position of the camera via the comparison between frames, thus conveniently measuring variation in the position of the camera without requiring a texture around feature points or individual identification marks.

Furthermore, the present invention may simply measure variation in the position of a camera, and then be easily applied to 3D object scanning devices.

Figure 15:
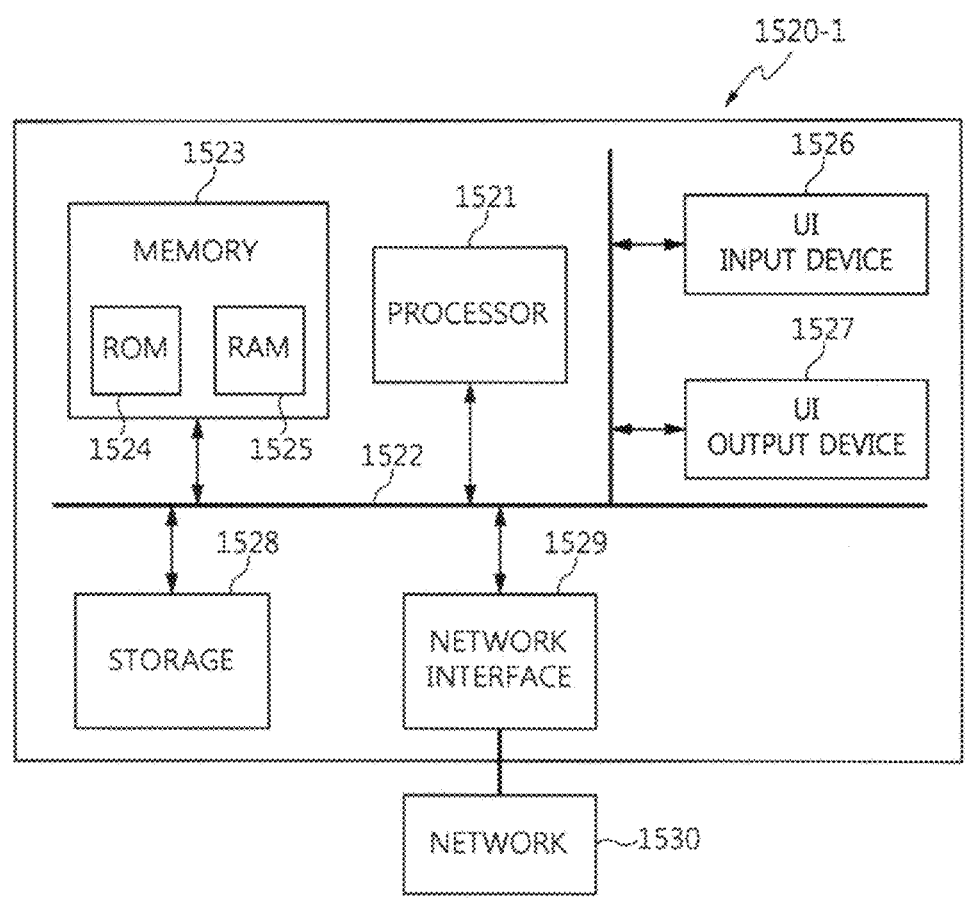
FIG. 15 is an embodiment of the present invention implemented in a computer system.

FIG. 15 is an embodiment of the present invention implemented in a computer system.

Referring to FIG. 15, an embodiment of the present invention may be implemented in a computer system, e.g., as a computer readable medium. As shown in in FIG. 15, a computer system 1520-1 may include one or more of a processor 1521, a memory 1523, a user input device 1526, a user output device 1527, and a storage 1528, each of which communicates through a bus 1522. The computer system 1520-1 may also include a network interface 1529 that is coupled to a network 1530. The processor 1521 may be a central processing unit (CPU) or a semiconductor device that executes processing instructions stored in the memory 1523 and/or the storage 1528. The memory 1523 and the storage 1528 may include various forms of volatile or non-volatile storage media. For example, the memory may include a read-only memory (ROM) 1524 and a random access memory (RAM) 1525.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

As described above, in the apparatus and method for measuring the position of a stereo camera according to the present invention, the configurations and schemes in the above-described embodiments are not limitedly applied, and some or all of the above embodiments can be selectively combined and configured so that various modifications are possible.

What is claimed is:

1. An apparatus for measuring a position of a camera, comprising:
   a feature point extraction unit extracting feature points from images captured by a first camera and a second camera and generating a first feature point list based on the feature points;
   a feature point recognition unit extracting feature points from images captured by the cameras after the cameras have moved, generating a second feature point list based on the feature points captured after the cameras have moved, and recognizing actual feature points based on the first feature point list and the second feature point list; and
   a position variation measurement unit measuring variation in positions of the cameras based on variation in relative positions of the actual feature points.

2. The apparatus of claim 1, wherein the feature point extraction unit comprises:
   an epipolar line generation unit generating epipolar lines corresponding to respective feature points in the image captured by the first camera; and
   an extraction unit extracting feature points corresponding to the epipolar lines from the image captured by the second camera.

3. The apparatus of claim 2, wherein the extraction unit measures distances from the feature points in the image captured by the second camera to the epipolar lines, and extracts feature points, from which distances to the epipolar lines are less than or equal to a specific distance.

4. The apparatus of claim 1, wherein the feature point recognition unit comprises:
   a coordinate extraction unit extracting 3D position coordinates corresponding to respective feature points present in the first feature point list and the second feature point list;
   a distance measurement unit measuring distances between the feature points based on the 3D position coordinates; and
   a recognition unit searching for feature points present in the second feature point list that are identical to the feature points present in the first feature point list based on the measured distances, and recognizing found feature points as actual feature points.

5. The apparatus of claim 4, wherein the recognition unit is configured to, if feature points, from which distances to the feature points present in the first feature point list are less than or equal to a specific distance, are present in the second feature point list, recognize the feature points present in the first feature point list as the actual feature points.

6. The apparatus of claim 4, wherein the recognition unit recognizes the actual feature points using Random Sample Consensus (RANSAC).

7. The apparatus of claim 4, wherein the recognition unit comprises:
   a rigid transformation calculation unit calculating rigid transformations of respective feature points present in the first feature point list, based on the feature points present in the first feature point list and feature points present in the second feature point list that are located at a distance less than or equal to a specific distance from the feature points present in the first feature point list, and performing nonlinear optimization, thus calculating optimized rigid transformations; and
   a feature point recognition unit recognizing the actual feature points based on the optimized rigid transformations.

8. The apparatus of claim 7, wherein the feature point recognition unit recognizes feature points that have highest consistency in rigid transformations and are present in the second feature point list as actual feature points.

9. The apparatus of claim 5, wherein the position variation measurement unit comprises:
   a rigid transformation calculation unit calculating a rotation matrix and a translation vector based on the actual feature points, and calculating rigid transformations based on the rotation matrix and the translation vector; and
   a position variation calculation unit measuring variation in positions of the first and second cameras based on the rigid transformations.

10. A method for measuring a position of a camera, comprising:
    extracting feature points from images captured by a first camera and a second camera and generating a first feature point list based on the feature points;
    extracting feature points from images captured by the cameras after the cameras have moved, generating a second feature point list, and recognizing actual feature points based on the first feature point list and the second feature point list; and
    measuring variation in positions of the cameras based on the actual feature points.

11. The method of claim 10, wherein generating the first feature point list comprises:
    generating epipolar lines corresponding to respective feature points in the image captured by the first camera; and
    extracting feature points corresponding to the epipolar lines from the image captured by the second camera.

12. The method of claim 10, wherein generating the first feature point list comprises measuring distances from the feature points in the image captured by the second camera to the epipolar lines, and extracting feature points, from which distances to the epipolar lines are less than or equal to a specific distance.

13. The method of claim 10, wherein recognizing the actual feature points comprises:
    extracting 3D position coordinates corresponding to respective feature points present in the first feature point list and the second feature point list;
    measuring distances between the feature points based on the 3D position coordinates; and
    searching for feature points present in the second feature point list that are identical to the feature points present in the first feature point list based on the measured distances, and recognizing found feature points as actual feature points.

14. The method of claim 13, wherein recognizing the actual feature points is configured to, if feature points, from which distances to the feature points present in the first feature point list are less than or equal to a specific distance, are present in the second feature point list, recognize the feature points having the distances less than or equal to the specific distance as the actual feature points.

15. The method of claim 13, wherein recognizing the actual feature points is configured to recognize the actual feature points using Random Sample Consensus (RANSAC).

16. The method of claim 13, wherein recognizing the actual feature points comprises:
    calculating rigid transformations of respective feature points present in the first feature point list, based on the feature points present in the first feature point list and feature points present in the second feature point list that are located at a distance less than or equal to a specific distance from the feature points present in the first feature point list; and
    recognizing actual feature points based on the rigid transformations.

17. The method of claim 16, wherein recognizing the actual feature points is configured to recognize feature points that have highest consistency in rigid transformations and are present in the second feature point list as actual feature points.

18. The method of claim 10, wherein measuring the variation in the positions of the first camera and the second camera comprises:
    calculating a rotation matrix and a translation vector based on the actual feature points, calculating rigid transformations based on the rotation matrix and the translation vector, performing nonlinear optimization, and extracting optimized rigid transformations; and
    measuring variation in positions of the first and second cameras based on the rigid transformations.

* * * * *